US008553081B2

(12) United States Patent
Abe

(10) Patent No.: US 8,553,081 B2
(45) Date of Patent: Oct. 8, 2013

(54) APPARATUS AND METHOD FOR DISPLAYING AN IMAGE OF VEHICLE SURROUNDINGS

(75) Inventor: Koichi Abe, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 1592 days.

(21) Appl. No.: 11/845,520

(22) Filed: Aug. 27, 2007

(65) Prior Publication Data
US 2008/0055407 A1    Mar. 6, 2008

(30) Foreign Application Priority Data

Aug. 31, 2006 (JP) ................................ 2006-234963

(51) Int. Cl.
H04N 7/00 (2011.01)
(52) U.S. Cl.
USPC .................... 348/118; 348/222.1; 345/614
(58) Field of Classification Search
USPC .................. 348/148, 222.1, 218.1; 340/988; 345/614, 1.1
See application file for complete search history.

(56) References Cited

U.S. PATENT DOCUMENTS

| | | | |
|---|---|---|---|
| 6,272,431 B1 * | 8/2001 | Zamojdo et al. | 701/211 |
| 6,812,831 B2 * | 11/2004 | Ikeda | 340/435 |
| 7,027,616 B2 * | 4/2006 | Ishii et al. | 382/104 |
| 7,139,412 B2 * | 11/2006 | Kato et al. | 382/104 |
| 7,161,616 B1 * | 1/2007 | Okamoto et al. | 348/148 |
| 7,212,653 B2 | 5/2007 | Sato et al | |
| 7,266,219 B2 * | 9/2007 | Okamoto et al. | 382/104 |
| 7,486,801 B2 * | 2/2009 | Suzuki et al. | 382/103 |
| 7,502,048 B2 * | 3/2009 | Okamoto et al. | 348/148 |
| 7,505,047 B2 * | 3/2009 | Yoshimura | 345/620 |
| 7,554,573 B2 * | 6/2009 | Mizusawa | 348/115 |
| 7,825,953 B2 * | 11/2010 | Kato et al. | 348/148 |
| 2001/0045979 A1 * | 11/2001 | Matsumoto et al. | 348/43 |
| 2002/0034316 A1 * | 3/2002 | Ishii et al. | 382/104 |
| 2002/0167589 A1 * | 11/2002 | Schofield et al. | 348/148 |
| 2002/0186298 A1 * | 12/2002 | Ikeda | 348/148 |
| 2003/0085999 A1 * | 5/2003 | Okamoto et al. | 348/148 |
| 2004/0032493 A1 * | 2/2004 | Franke et al. | 348/148 |
| 2004/0201587 A1 * | 10/2004 | Mizusawa | 345/427 |
| 2005/0083427 A1 * | 4/2005 | Imoto | 348/335 |

FOREIGN PATENT DOCUMENTS

| | | |
|---|---|---|
| JP | 3300334 | 4/2002 |
| JP | 2003-149711 | 5/2003 |
| JP | 2003-196645 | 7/2003 |
| JP | 2004-254219 | 9/2004 |
| JP | 2005-142657 | 6/2005 |
| WO | WO00/64175 | 10/2000 |

OTHER PUBLICATIONS

Office action issued by the Japanese Patent Office on May 10, 2011, in related Japanese patent application No. 2006-234963.

* cited by examiner

Primary Examiner — El Hadji Sall
(74) Attorney, Agent, or Firm — Brinks Hofer Gilson & Lione

(57) ABSTRACT

When images of vehicle surroundings are captured by cameras and are displayed together with an image of a vehicle, surrounding images within a predetermined distance from the vehicle are displayed at the same scale as the scale of the vehicle image, and surrounding images outside the predetermined distance are displayed at a larger scale than the scale of the vehicle image. The surrounding images may be displayed at a progressively larger scale as the distance from the vehicle increases.

12 Claims, 11 Drawing Sheets

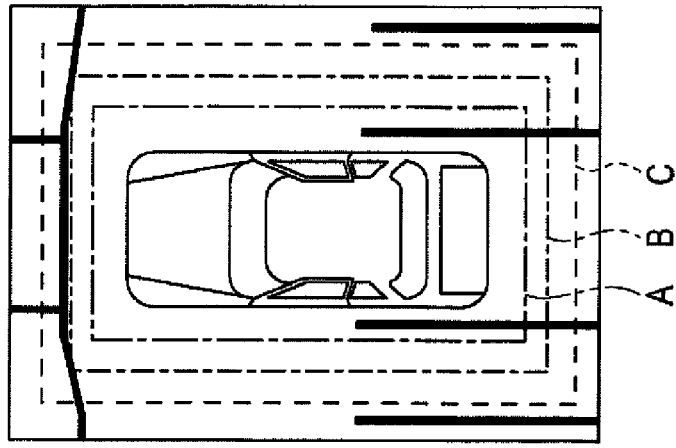
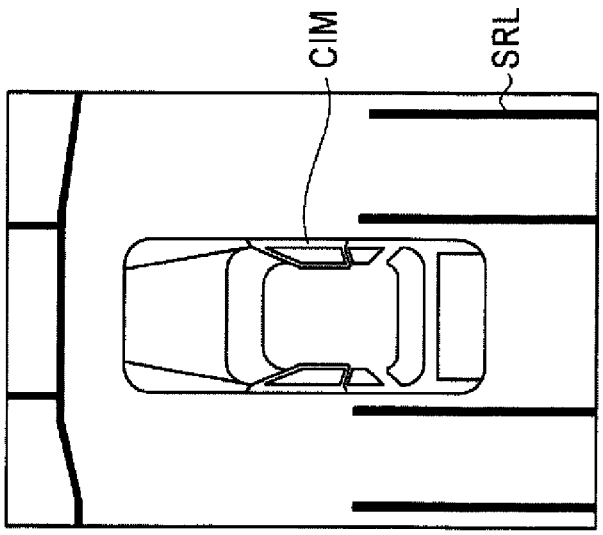
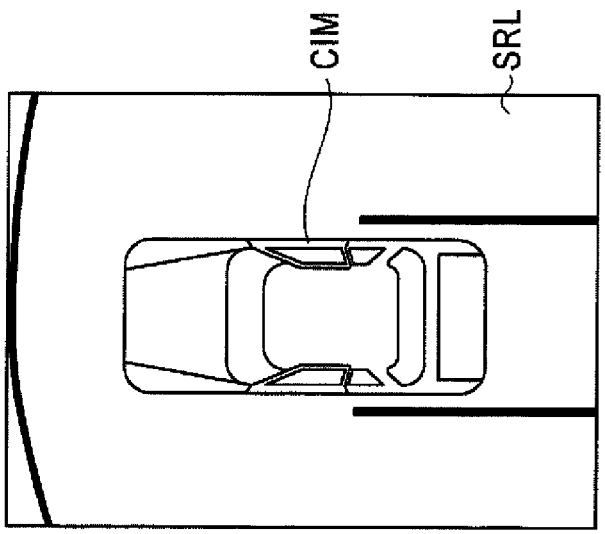

APPARATUS AND METHOD FOR DISPLAYING AN IMAGE OF VEHICLE SURROUNDINGS

BACKGROUND OF THE INVENTION

1. Related Applications

The present application claims priority to Japanese Patent Application Number 2006-234963, filed Aug. 31, 2006, the entirety of which is hereby incorporated by reference.

2. Field of the Invention

The present invention relates to apparatuses and methods for displaying images of vehicle surroundings. In particular, the present invention relates to a surrounding-image display apparatus and display method for causing cameras to capture surrounding images of a vehicle and displaying the captured images together with a vehicle image.

3. Description of the Related Art

A system in which images of the rear side of or an area around a vehicle are captured by a camera or cameras attached to the vehicle and are displayed on a vehicle-mounted monitor to assist the driver in driving the vehicle into a garage or in parking the vehicle is under research and is also in practical use. As such a system, a top-view system is known (refer to Japanese Patent Document No. 3300334). In the top-view system, as shown in FIGS. 10A and 10B, cameras 6a to 6e for photographing the surroundings of a vehicle 1 are attached thereto. Using the images captured by the cameras 6a to 6e, an image synthesis processor 7 creates a synthesized image of a landscape viewed in a predetermined direction from a predetermined position (a virtual viewpoint) 8 above the vehicle 1, as shown in FIG. 10C, and displays the synthesized image on a monitor 9, thereby assisting the driver, for example, in parking the vehicle and driving the vehicle into the garage.

In the known top-view system, the display scale is constant for the entire screen (i.e., equal-scale display) so as to make it easier for the driver to get a sense of distance. That is, a surrounding image is displayed at the same scale as that of the vehicle image (see FIG. 11A). However, with such a display method, when the scale of a vehicle image 1a is increased, the display area of the vehicle surroundings is reduced to make it difficult for the driver to recognize the state around the vehicle. Conversely, when the surrounding area displayed on one screen is increased as shown in FIG. 11B, it becomes difficult to see details of the image. Currently, the vehicle image and the surrounding image are displayed at a scale such that an image within about 2 meters around the vehicle can be displayed, as shown in FIG. 11A. However, although such a display method makes it easier for the driver to get a sense of distance to an object displayed on the screen, there is a problem in that the area displayed on the screen is small.

Thus, as shown in FIG. 12, for example, a technology in which top-view display TVEW and back-view display BVEW are simultaneously performed is available. In this technology, however, the screen is divided into two sections to display images; therefore, it is difficult to see a surrounding image of the vicinity of the vehicle, as in the case in which an image is displayed at an increased scale.

Also, when the display area is merely increased, i.e., when equal-scale display is performed, an image far away from the vehicle is displayed with a reduced resolution. Thus, there is a problem in that blurring in an image far away from the vehicle becomes more noticeable than an image of the vicinity of the vehicle.

SUMMARY OF THE INVENTION

Accordingly, it is an object of the present invention to allow a surrounding image of the vicinity of a vehicle to be easily viewed and also allow the display area to be increased.

Another object of the present invention is to prevent blurring from occurring even when the display area is increased.

A first aspect of the present invention provides a surrounding-image display method for causing cameras to capture images of the surroundings of a vehicle and displaying the captured images together with an image of the vehicle. The method includes a step of displaying a surrounding image within a predetermined distance from the vehicle at the same scale as a scale of the vehicle image, and a step of displaying a surrounding image outside the predetermined distance at a larger scale than the scale of the vehicle image. In the first aspect, preferably, the scale is increased as a distance from the vehicle increases. In addition, the surrounding images may be displayed at a variable scale in association with a state of the vehicle, for example, in accordance with a gear shift selection, a vehicle speed, or a navigation instruction.

A second aspect of the present invention provides a surrounding-image display method for capturing images of the surroundings of a vehicle and displaying the captured images together with an image of the vehicle. The method includes a step of causing fisheye cameras to capture images of at least a landscape ahead of the vehicle, a landscape behind the vehicle, a landscape to the left side of the vehicle, and a landscape to the right side of the vehicle and storing the captured images in camera frame memories; a step of providing a table for storing relationships between pixels constituting a screen and addresses in the camera frame memories; and a step of storing, in the table, the relationships so that surrounding images within a predetermined distance from the vehicle are displayed at the same scale as the scale of the vehicle image, and surrounding images outside the predetermined distance are displayed at a larger scale than the scale of the vehicle image. The method further includes a step of mapping pixel data in the camera frame memories to a screen frame memory by using the relationships in the table to combine the surrounding images, a step of reading the combined surrounding images from the screen frame memory, and a step of displaying the read surrounding images on a monitor.

In the second aspect, the relationships are stored in the table so that the surrounding images are displayed at a larger scale as a distance from the vehicle increases. Preferably, the vehicle image is pre-stored and the pre-stored vehicle image is displayed superimposed on the surrounding images. In addition, the surrounding images may be displayed at a variable scale in association with a state of the vehicle, for example, in accordance with a gear shift selection, a vehicle speed, or a navigation instruction. The surrounding images may be displayed at the same scale as the scale of the vehicle image or at the variable scale in association with the state of the vehicle.

A third aspect of the present invention provides a surrounding-image display apparatus for displaying, on a monitor, images of the surroundings of a vehicle together with an image of the vehicle. The apparatus includes cameras for capturing images of at least a landscape ahead of the vehicle, a landscape behind the vehicle, a landscape to the left side of the vehicle, and a landscape to the right side of the vehicle; camera frame memories for storing the surrounding images captured by the cameras; and a controller for performing control so that surrounding images within a predetermined distance from the vehicle are displayed at the same scale as a scale of the vehicle image and surrounding images outside the predetermined distance are displayed at a larger scale than the scale of the vehicle image. In the third aspect, the controller causes the surrounding images to be displayed at a larger scale as a distance from the vehicle increases.

A fourth aspect of the present invention provides a surrounding-image display apparatus for displaying, on a monitor, images of the surroundings of a vehicle together with an image of the vehicle. The apparatus includes fisheye cameras for capturing images of at least a landscape ahead of the vehicle, a landscape behind the vehicle, a landscape to the left side of the vehicle, and a landscape to the right side of the vehicle; camera frame memories for storing the surrounding images captured by the fisheye cameras; a table for storing relationships between pixels constituting a screen and addresses in the camera frame memories; and a mapping unit for mapping pixel data in the camera frame memories to a screen frame memory by using the relationships in the table. The relationships are stored in the table so that surrounding images within a predetermined distance from the vehicle are displayed at the same scale as a scale of the vehicle image and surrounding images outside the predetermined distance are displayed at a larger scale than the scale of the vehicle image, and the surrounding images are read from the screen frame memory and are displayed on the monitor.

The apparatus according the fourth aspect may further include a vehicle-image storage unit for pre-storing the vehicle image and a synthesizer for combining the vehicle image with the surrounding images by superimposition. When a speed of the vehicle is a predetermined speed or less, the surrounding images may be displayed on the monitor at the variable scale.

In the apparatus according to the fourth aspect, when the vehicle is shifted into reverse gear, the surrounding images may be displayed at the variable scale.

In the apparatus according to the fourth aspect, the surrounding images may be displayed at the variable scale in accordance with an instruction from a navigation apparatus.

The apparatus according to the fourth aspect further includes a second table for storing relationships that are used to display the surrounding images at the same scale as the scale of the vehicle image, and a surrounding-image determining unit for determining whether the surrounding images are to be displayed at the same scale as the scale of the vehicle image or are to be displayed at the variable scale, in association with a state of the vehicle. The mapping unit may perform the mapping using the table according to the determination performed by the surrounding-image determining unit.

According to the present invention, surrounding images within the predetermined distance from the vehicle are displayed at the same scale as the scale of the vehicle image, and surrounding images outside the predetermined distance are displayed at a larger scale than the scale of the vehicle image. This arrangement, therefore, allows surrounding images in the vicinity of the vehicle to be easily viewed and also allows the display area to be increased. In addition, even when the display area is increased, blurring can be prevented.

In addition, according to the present invention, for example, when the vehicle speed is a predetermined speed or less, when the vehicle is shifted into reverse gear, or when an instruction is received from the navigation apparatus, the surrounding images are displayed at a variable scale. Thus, displaying the surrounding images at appropriate times makes it possible to assist the driver in driving the vehicle.

In addition, since the surrounding images are displayed at the same scale as that of the vehicle image or at a variable scale, top-view display can be performed in a manner suitable for the state of the vehicle.

BRIEF DESCRIPTION OF THE DRAWINGS

FIGS. 1A to 1C are diagrams illustrating a principle of the present invention;

DESCRIPTION OF THE PREFERRED EMBODIMENTS (A) Principles of the Present Invention FIGS. 1A to 1C are diagrams illustrating a principle of the present invention. FIG. 1A shows an example in which a surrounding image is displayed at the same scale 1/S as that of a vehicle image CIM. FIG. 1B shows an example in which a surrounding image within a predetermined distance from the vehicle is displayed at the same scale 1/S as that of the vehicle image CIM and a surrounding image outside the predetermined distance is displayed at a larger scale than the scale 1/S of the vehicle image CIM.

That is, a surrounding image inside frame A shown in FIG. 1C is displayed at the same scale 1/S as that of the vehicle image CIM; a surrounding image between frame A and frame B is displayed at a larger scale than the scale 1/S, for example, at a scale of (8/10)×1/S; a surrounding image between frame B and frame C is displayed at an even larger scale than the scale of (8/10)×1/S, for example, at a scale of (6/10)×1/S; and a surrounding image outside frame C is displayed at a maximum scale, for example, at a scale of (4/10)×1/S. As a result, when surrounding images are displayed at variable scales as shown in FIG. 1B, a surrounding image of a larger area than a fixed-scale surrounding image shown in FIG. 1A can be displayed.

Figure 2A:
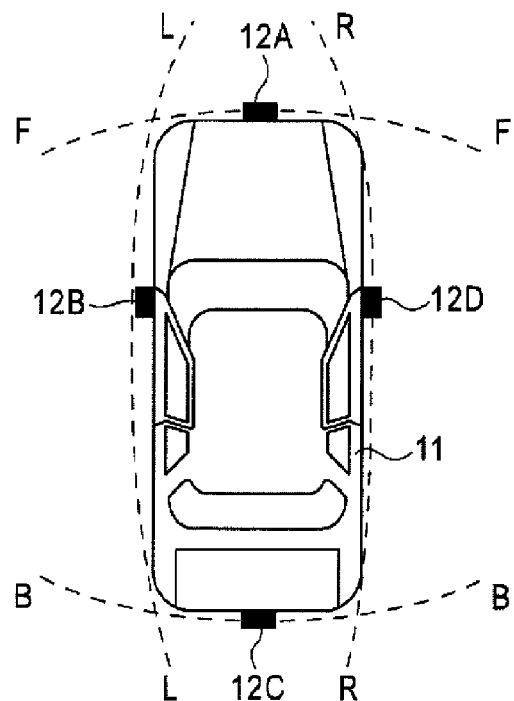
FIGS. 2A to 2C are diagrams illustrating a method for acquiring surrounding images.
Figure 2B:
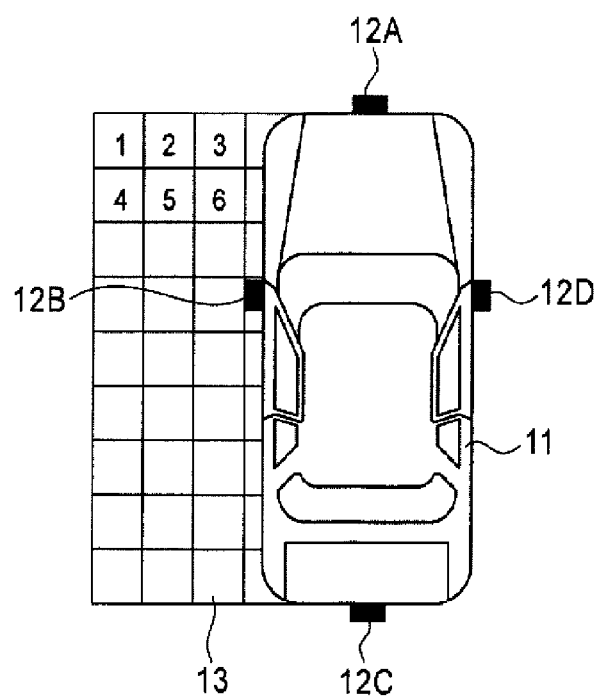
Figure 2C:
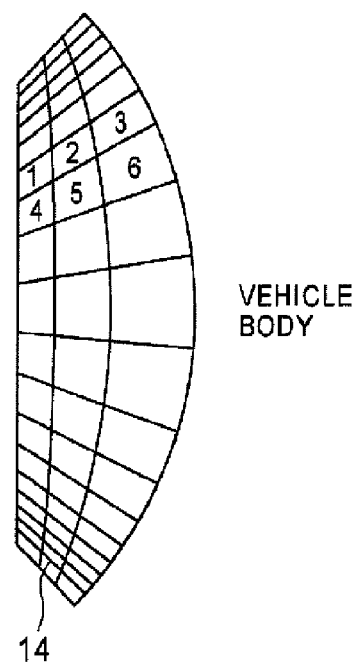

FIGS. 2A to 2C are diagrams illustrating a method for acquiring the surrounding images. Cameras 12A, 12B, 12C, and 12D are attached to a front portion, left and right side portions, and a rear portion of a vehicle 11. Using a fisheye lens, each of the cameras 12A to 12D can photograph a landscape in the range of 185° in front of the camera. The camera 12A photographs a landscape ahead of line FF, the camera 12B photographs a vehicle-left-side landscape to the left side of line LL, the camera 12C photographs a vehicle rear landscape behind line BB, and the camera 12D photographs a vehicle-right-side landscape to the right side of line RR.

When a rectangular grid pattern on the left side of the vehicle 11 is photographed by the camera 12B, as shown in FIG. 2B, a graphic viewed by a fisheye lens (the graphic is herein referred to as a "fisheye graphic") is obtained as shown in FIG. 2C. In a rectangular graphic 13 and a fisheye graphic 14, areas denoted by the same reference numerals correspond to each other. That is, areas 1 to 6 in the rectangular graphic 13 correspond to areas 1 to 6 in the fisheye graphic 14. Thus, when images of the fisheye-graphic areas 1 to 6 corresponding to images of the areas 1 to 6 in the rectangular graphic 13 are stored at frame-memory positions where the images of the areas 1 to 6 in the rectangular graphic are to be stored, a rectangular image converted from the images photographed by the fisheye camera 12B can be displayed on a monitor.

Figure 3:
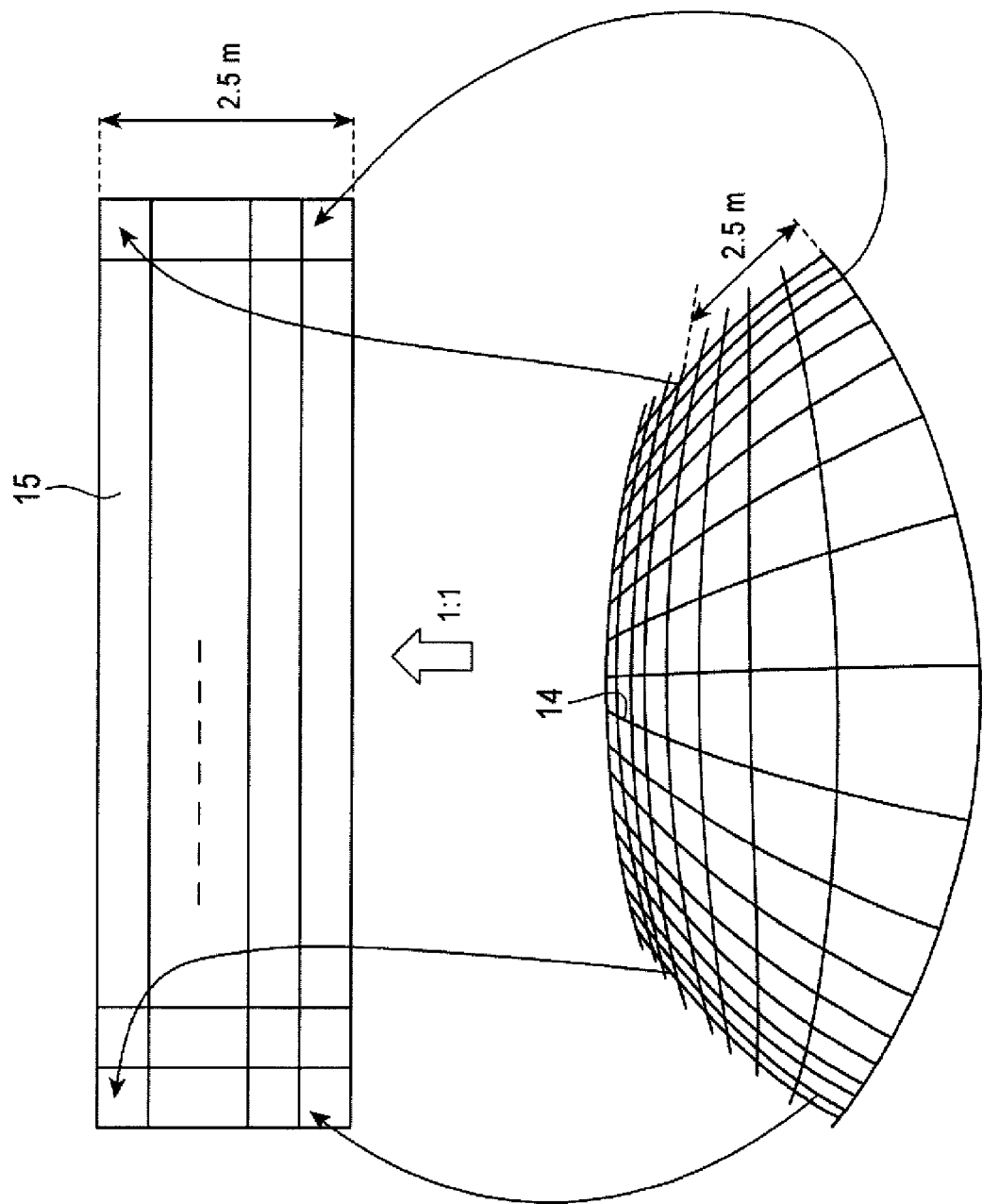
FIG. 3 is a diagram illustrating a case in which pixel data of an image of a fisheye graphic are mapped to a frame memory.

FIG. 3 is a diagram illustrating a case in which pixel data of an image of the fisheye graphic 14 are mapped to a frame memory 15. It is now assumed that the frame memory 15 has a storage area for storing a 2.5-meter wide rectangular graphic. Pixel data of the 2.5-meter wide fisheye graphic 14 are mapped to the frame memory 15 in accordance with relationships between the pixel positions of the fisheye graphic 14 and the pixel positions of the rectangular graphic 13 (see FIG. 2). Thus, when the image is read from the frame memory 15, the grid pattern of the rectangular graphic can be displayed.

The above description has been given for a case in which the pixel data of the fisheye graphic 14 are mapped to the frame memory 15 without being thinned out. The pixel data, however, may be thinned out with a variable mapping rate of the fisheye graphic outside a predetermined distance from the vehicle body, so that a surrounding image of a larger area can be stored in the frame memory 15.

Figure 4:
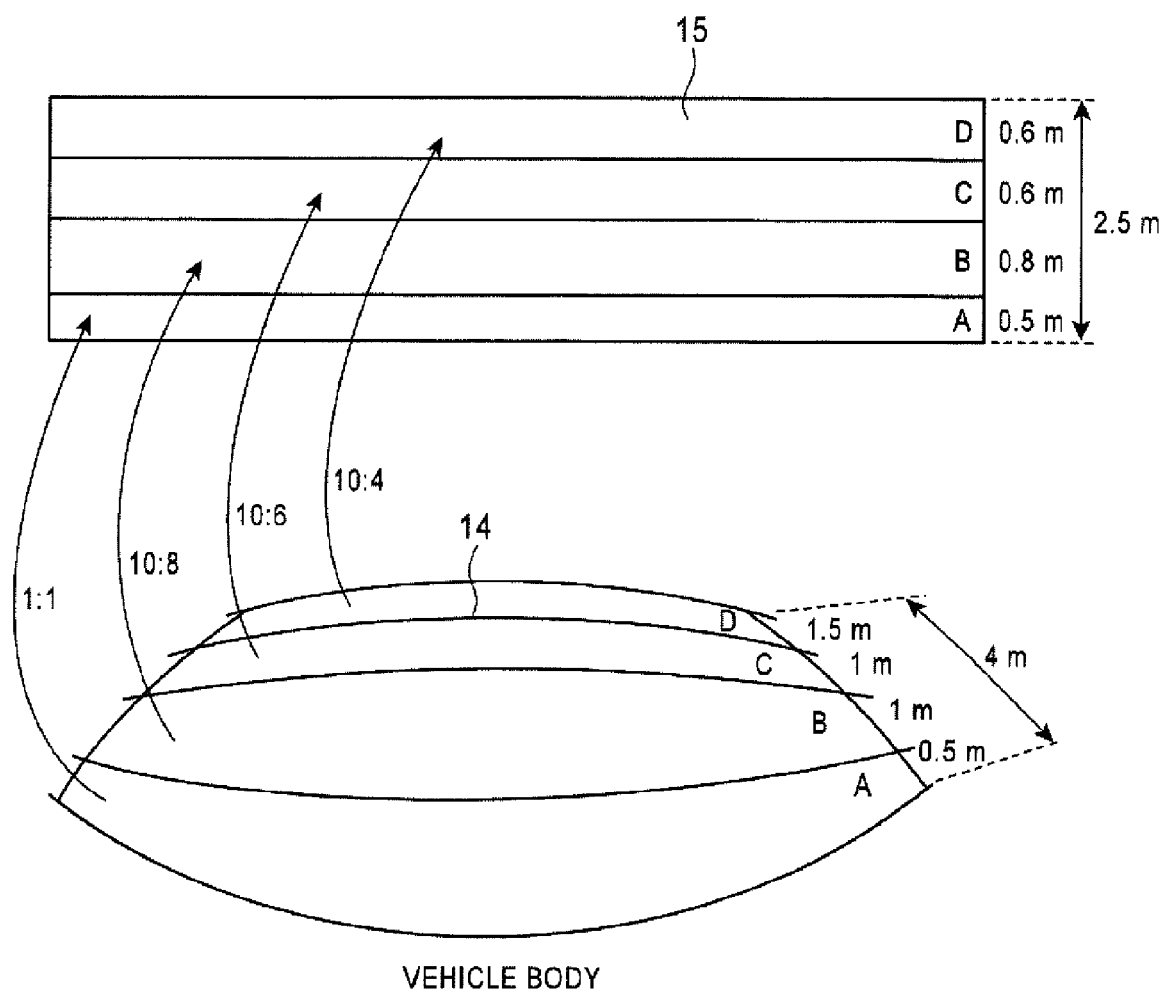
FIG. 4 is a diagram illustrating a case in which the thinning rate (the mapping rate) of the fisheye graphic is varied according to the distance from a vehicle body.

FIG. 4 is a diagram illustrating an example in which the thinning rate (the mapping rate) of the fisheye graphic is varied according to the distance from the vehicle body. In this example, a fisheye graphic 14 having a width of 4 meters from the vehicle body is mapped to a frame memory 15 for storing a 2.5-meter wide rectangular graphic. The term "mapping rate" refers to the ratio of the number of pieces of pixel data of a fisheye graphic to the number of pixels actually mapped to the frame memory 15.

A method for the mapping involves, for example:

(1) mapping all pixel data of a fisheye graphic in area A at a distance up to 0.5 meter from the vehicle body to a memory area A in the frame memory 15 at a mapping rate of 1 to 1 without thinning out the pixel data in the width direction, (2) mapping pixel data of a fisheye graphic in area B between 0.5 meter and 1.5 meters from the vehicle body to a memory area B in the frame memory 15 at a mapping rate of 10 to 8 by thinning out 20% of the pixel data in the width direction, (3) mapping pixel data of a fisheye graphic in area C between 1.5 meters and 2.5 meters from the vehicle body to a memory area C in the frame memory 15 at a mapping rate of 10 to 6 by thinning out 40% of the pixel data in the width direction, and (4) mapping pixel data of a fisheye graphic in area D between 2.5 meters and 4.0 meters from the vehicle body to a memory area D in the frame memory 15 at a mapping rate of 10 to 4 by thinning out 60% of the pixel data in the width direction.

Varying the mapping rate as described above allows the 4-meter wide fisheye graphic 14 to be stored in the frame memory 15 having a capacity for storing a 2.5-meter wide rectangular graphic. The memory area A in the frame memory 15 stores a 0.5-meter wide rectangular graphic, the memory area B stores a 0.8-meter wide rectangular graphic, and the memories C and D each store a 0.6-meter wide rectangular graphic.

The mapping method (shown in FIG. 4) using the variable mapping rate is equivalent to a method in which a fisheye graphic (a surrounding image) is mapped to the frame memory so that the fisheye graphic is displayed at a variable scale. That is, the mapping method shown in FIG. 4 is equivalent to a method in which a fisheye graphic in the range of 0.5 meter from the vehicle body is mapped so as to be displayed at the same scale as a scale 1/S of the vehicle image, and surrounding images outside the range of 0.5 meter are mapped so as to be displayed at greater scales than the scale 1/S of the vehicle image, i.e., at scales of (8/10)×1/S, (6/10)× 1/S, and (4/10)×1/S, respectively.

Although the above description has been given for an example in which the fisheye graphic 14 photographed by the fisheye camera 12B is mapped to the frame memory 15 at variable mapping rates, i.e., at variable scales, the same processing is also performed when fisheye graphics photographed by the other fisheye cameras 12A, 12C, and 12D are mapped to the frame memory 15.

Figure 5:
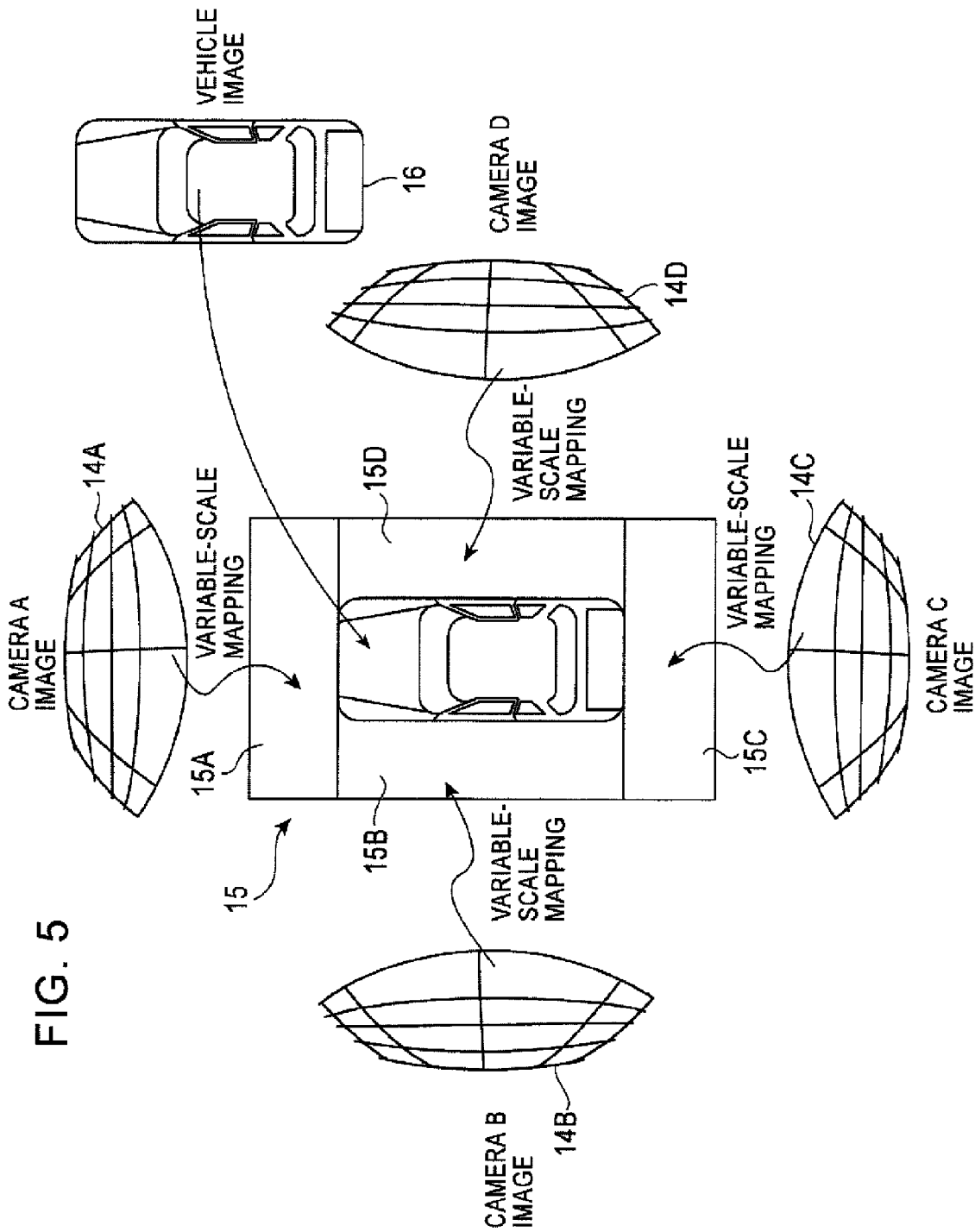
FIG. 5 is a diagram illustrating a case in which fisheye graphics photographed by fisheye cameras are mapped to a frame memory for a screen.

FIG. 5 is a diagram illustrating a case in which fisheye graphics 14A to 14D photographed by the fisheye cameras 12A to 12D are mapped to a frame memory 15 for a screen. The fisheye graphics 14A to 14D are mapped to corresponding areas 15S to 15D in the screen frame memory 15, and a pre-photographed and stored vehicle image 16 is mapped to the center portion in the screen frame memory 15, so that an image for one screen is generated in the screen frame memory 15. The pixels of the fisheye graphics 14A and 14C are thinned out in the vertical direction, and the pixels of the fisheye graphics 14B and 14D are thinned out in the horizontal direction, and the resulting graphics are mapped to the screen frame memory 15.

In practice, mapping data are pre-stored in a mapping table (which is described below) so that surrounding images within a predetermined distance from the vehicle, e.g., within a distance of 0.5 meter, are displayed at the same scale as that of the vehicle image, and surrounding images outside the predetermined distance are displayed at larger scales than that of the vehicle image. Based on the mapping data, the fisheye graphics are mapped to the screen frame memory 15.

(B) First Embodiment

Figure 6:
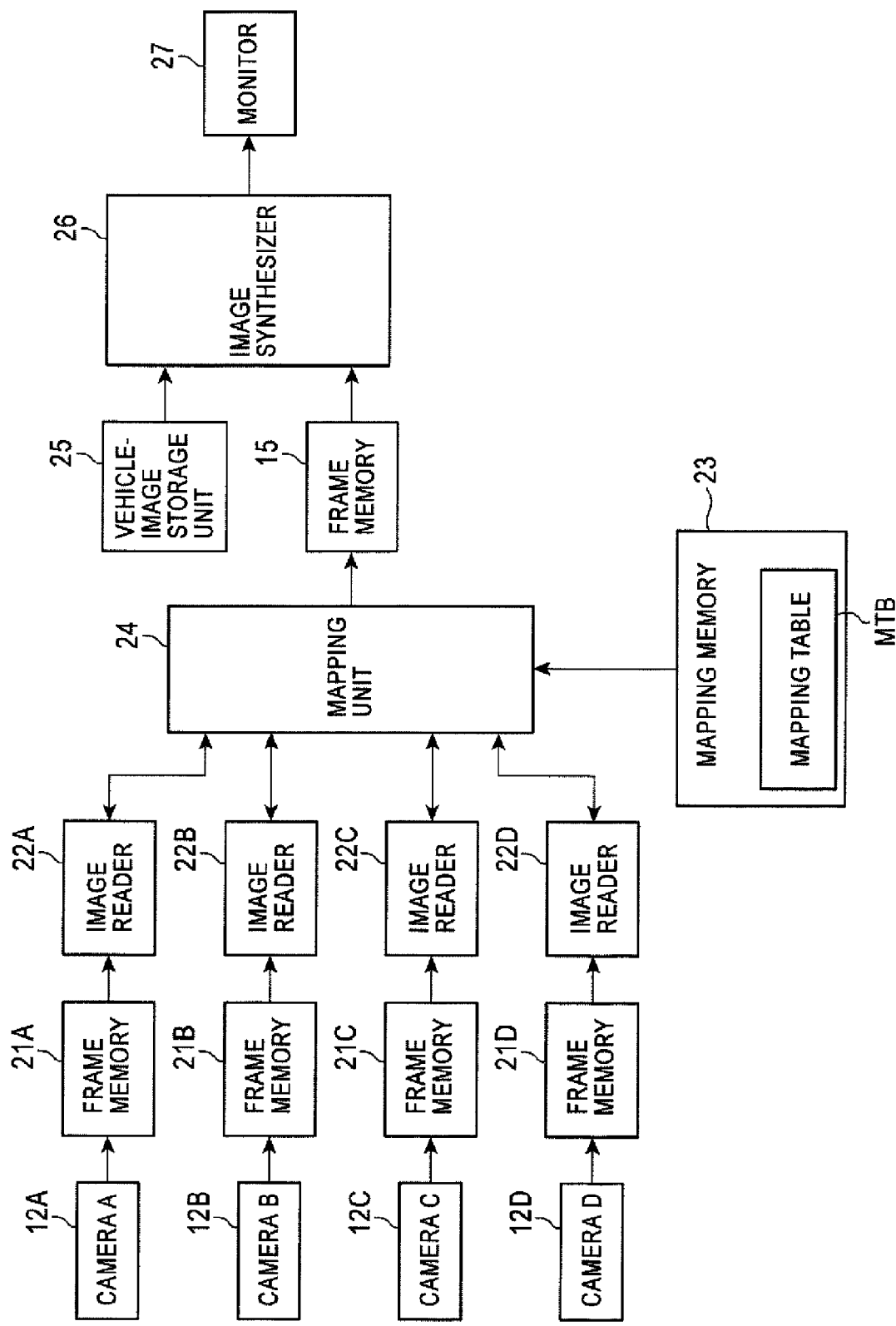
FIG. 6 is a block diagram of a surrounding-image display apparatus according to a first embodiment.

FIG. 6 is a block diagram of a surrounding-image display apparatus according to a first embodiment.

The cameras 12A, 12B, 12C, and 12D are attached to the front portion, left and right side portions, and rear portion of the vehicle 11 (as shown in FIG. 2) to photograph a landscape ahead of the vehicle, a landscape to the left side of the vehicle, a landscape behind the vehicle, and a landscape to the right side of the vehicle, respectively. The photographed landscapes are stored in frame memories 21A to 21D for the cameras. Using a fisheye lens, each of the cameras 12A, 12B, 12C, and 12D can photograph a landscape in the range of 185° in front of the camera. Image readers 22A to 22D read image data from specified addresses in the corresponding camera frame memories 21A to 21D and output the read image data to a mapping unit 24 described below.

A mapping memory 23 stores a mapping table MTB for mapping the fisheye graphics 14A to 14D (see FIG. 5), stored in the camera frame memories 21A to 21D, to the frame memory 15 for the screen. The mapping table MTB is created so that the pixel data of the fisheye graphics are mapped to the screen frame memory 15 at variable mapping rates, as described above with reference to FIG. 4.

Figure 7:
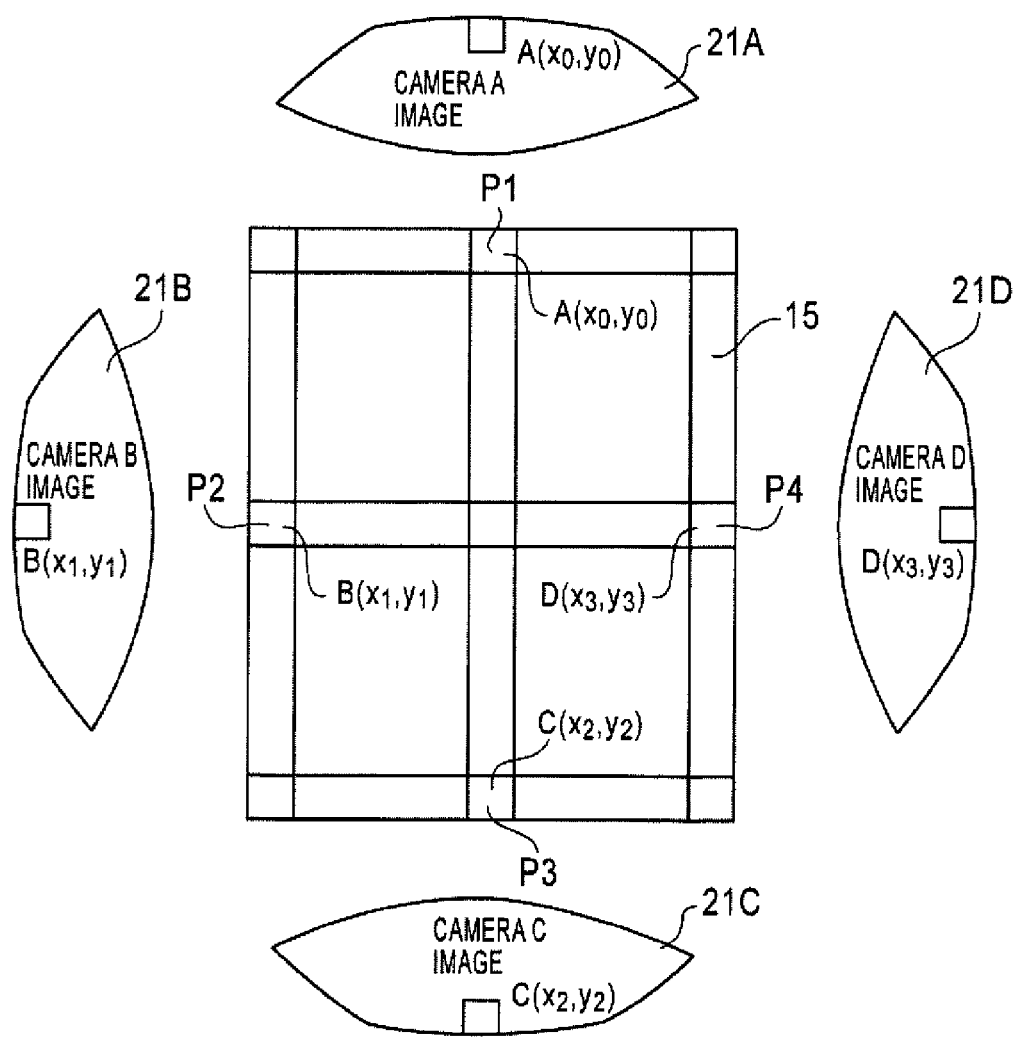
FIG. 7 is a diagram illustrating a mapping table.

FIG. 7 is a diagram illustrating the mapping table MTB.

The mapping table MTB is used to identify addresses in the camera frame memories 21A to 21D in which the fisheye-graphics pixel data to be mapped to N×M storage positions in the screen frame memory 15 are stored. For example, when a fisheye graphic stored at address A ($x_0$, $y_0$) in the camera frame memory 21A is to be mapped to a storage position P1 in the screen frame memory 15, the mapping table MTB stores a relationship between the storage position P1 and the address A ($x_0$, $y_0$). Similarly, for example, when a fisheye graphic stored at addresses B ($x_1$, $y_1$), C ($x_2$, $y_2$), and D ($x_3$, $y_3$) in the camera frame memories 21B to 21D are to be mapped to corresponding storage positions P2 to P4 in the screen frame memory 15, the mapping table MTB stores relationships between the storage positions P2 to P4 and the corresponding addresses B ($x_1$, $y_1$), C ($x_2$, $y_2$), and D ($x_3$, $y_3$).

The mapping table MTB can be automatically created based on the mapping rate for each range of distance from the vehicle, and also can be created through a trial and error process while viewing the synthesized image.

A mapping unit 24 scans the mapping table MTB in a raster direction to sequentially read addresses in the camera frame memories for each pixel. The mapping unit 24 then reads image data from the addresses in the camera frame memories and writes the read image data to the screen frame memory 15. When the writing processing is completed for all pixels, surrounding-image data are mapped to the screen frame memory 15. That is, surrounding-image data that are used to cause surrounding images within a predetermined distance from the vehicle to be displayed at the same scale as that of the vehicle image and to cause surrounding images outside the predetermined distance to be displayed at larger scales than that of the vehicle image are written to the screen frame memory 15.

The vehicle-image storage unit 25 pre-stores the vehicle image. An image synthesizer 26 combines the vehicle image and the surrounding images in the screen frame memory 15 and displays the synthesized image on a monitor 27.

As described above, according to the first embodiment, surrounding images within the predetermined distance from the vehicle are displayed at the same scale as that of the vehicle image, and surrounding images outside the predetermined distance can be displayed at larger scales than that of the vehicle image. This arrangement, therefore, allows surrounding images in the vicinity of the vehicle to be easily viewed and also allows the display area to be increased. In addition, even when the display area is increased, blurring can be prevented.

Figure 8:
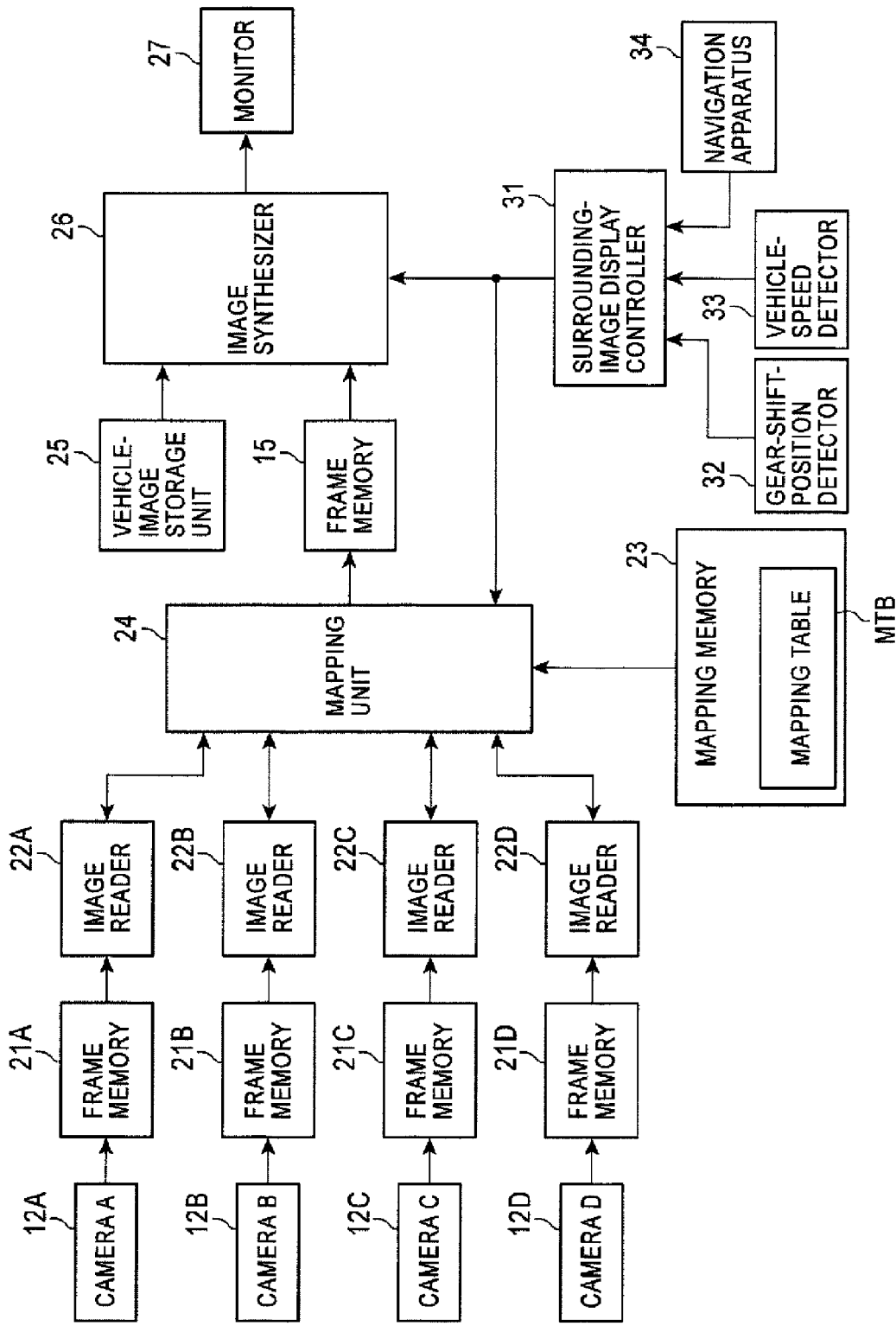
FIG. 8 is a block diagram of a modification of the first embodiment when display control is performed on a surrounding image in association with a state of the vehicle.

FIG. 8 is a modification of the first embodiment. In this modification, display control is performed on a surrounding image in association with a state of the vehicle. In FIG. 8, portions having the same configurations as those in FIG. 6 are denoted by the same reference numerals. FIG. 8 is different from FIG. 6 in that a surrounding-image display controller 31 is provided. The surrounding-image display controller 31 is connected to a gear-shift-position detector 32, a vehicle-speed detector 33, and a navigation apparatus 34 so as to receive a gear-shift-position signal, a vehicle-speed signal, and a navigation-instruction signal.

(1) When the vehicle is shifted into reverse gear (e.g., when backing the vehicle into a garage or during parking), (2) when the vehicle speed is a predetermined speed or less (e.g., during vehicle stopping, during parking, during driving in heavy traffic, or during left/right turn), or (3) when an instruction is received from the navigation apparatus 34 (e.g., during entry into an intersection or during entry into a parking facility), the surrounding-image display controller 31 controls the mapping unit 24 and the image synthesizer 26 to display a surrounding image on the monitor 27. Upon detecting that the vehicle enters an intersection, a parking facility, or a place where displaying a surrounding image can increase the safety based on the vehicle position, the navigation apparatus 34 issues an instruction to the surrounding-image display controller 31 so as to display a surrounding image.

(C) Second Embodiment

Although the first embodiment has been directed to a case in which one type of variable-scale surrounding image is displayed, there are cases in which it is more convenient if two or more types of surrounding image can be displayed so that surrounding images displayed are switched in association with a state of the vehicle. For example, a surrounding image showing a wide area is initially displayed, and when the rear end of the vehicle approaches a surrounding obstacle (such as another vehicle, a building, or a tree), a fixed-scale surrounding image similar to that in the known technology is displayed so as to make it easier for the driver to get a sense of distance.

Figure 9:
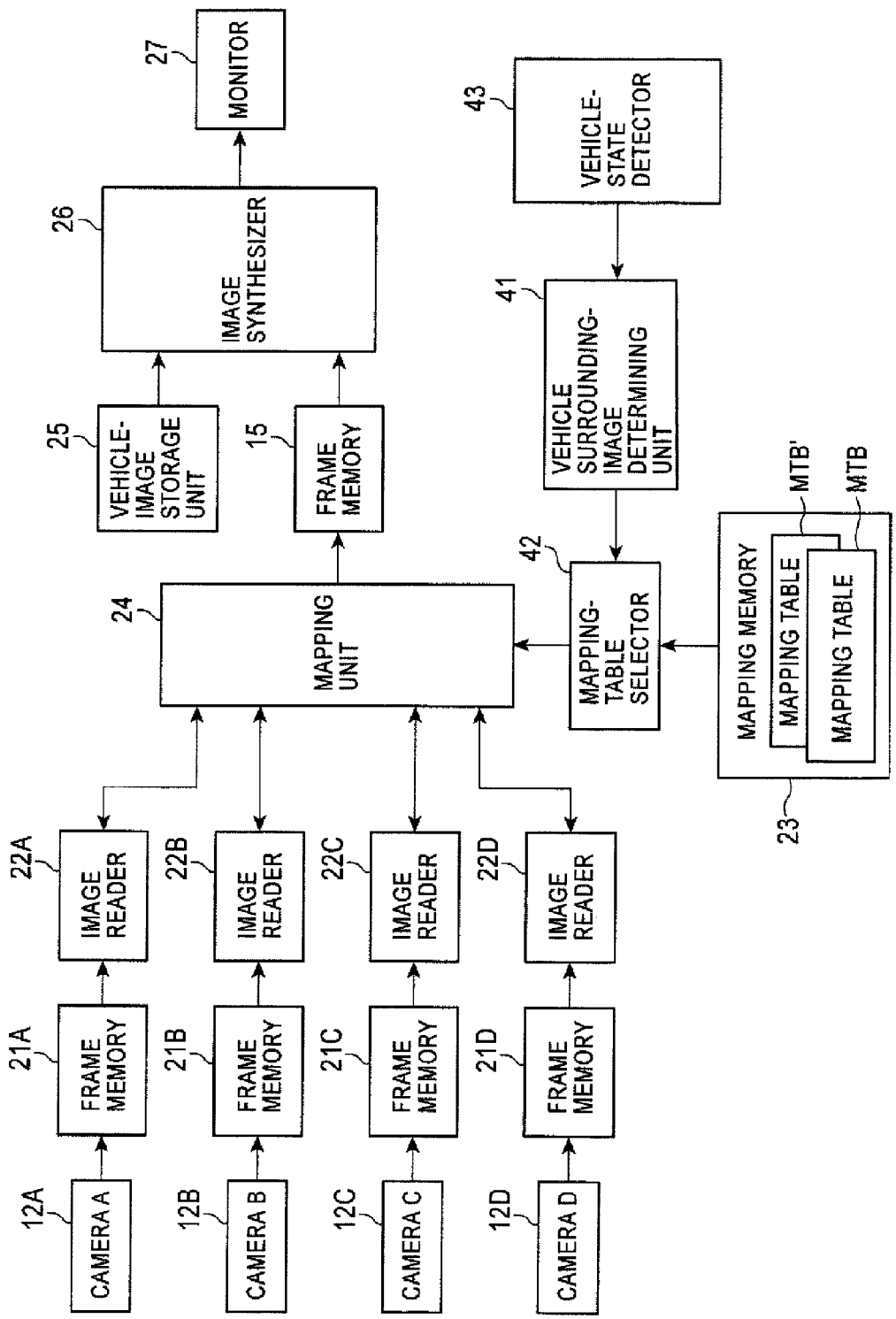
FIG. 9 is a block diagram of a surrounding-image display apparatus according to a second embodiment.
Figure 10A:
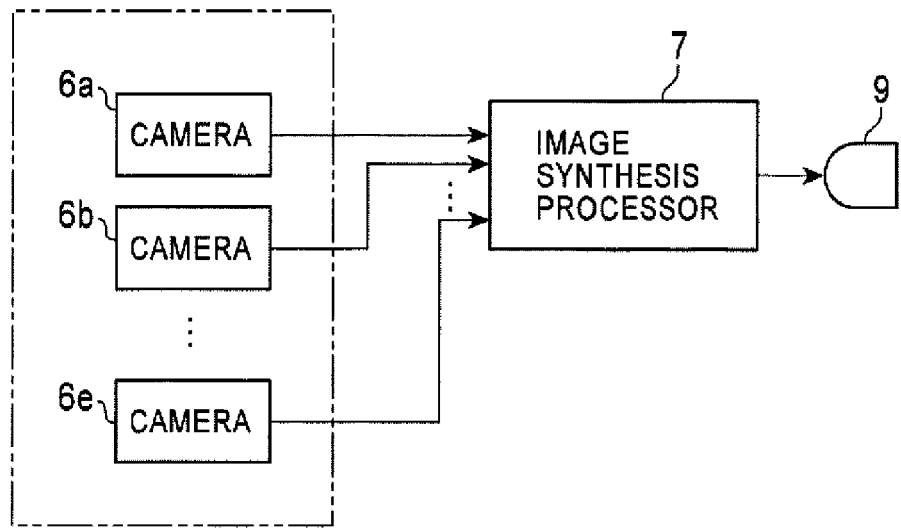
FIGS. 10A to 10C are diagrams illustrating a known top-view system.
Figure 10B:
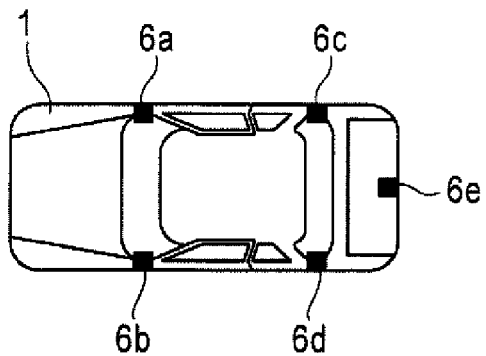
Figure 10C:
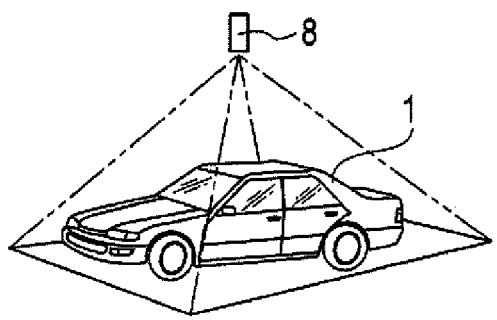
Figure 11A:
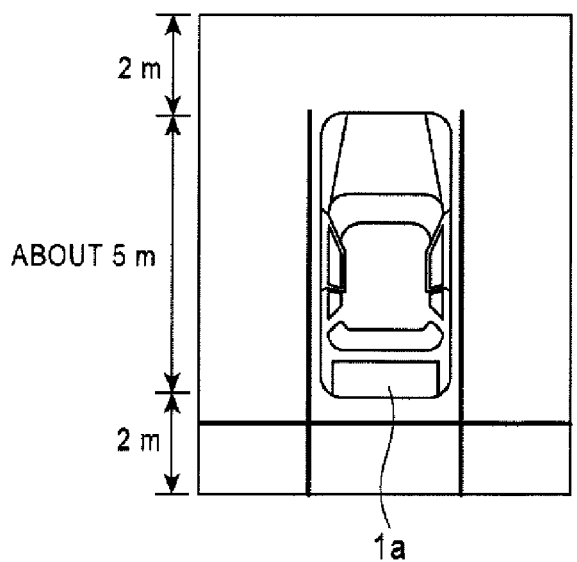
FIG. 11 shows a known example in which a surrounding image is displayed at the same scale as that of a vehicle image.
Figure 11B:
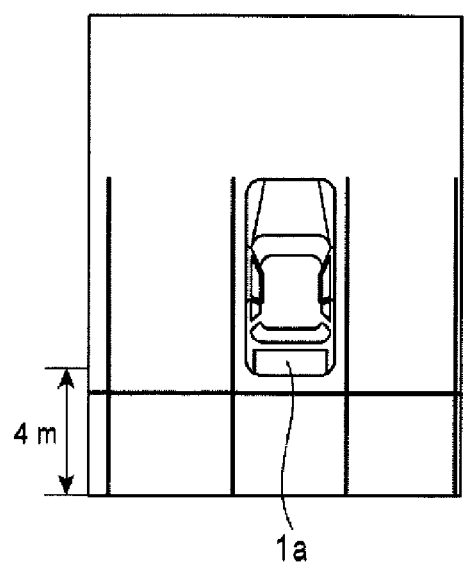
Figure 12:
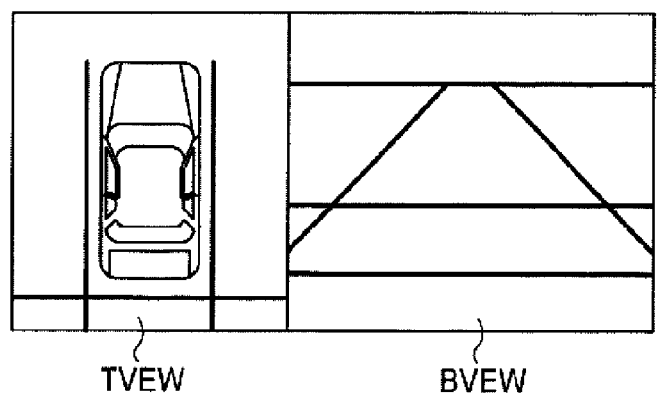
FIG. 12 is an example in which back-view display is performed simultaneously with top-view display.

FIG. 9 is a block diagram of a surrounding-image display apparatus according to a second embodiment. In FIG. 9, portions having the same configurations as those in FIG. 6 are denoted by the same reference numerals. The second embodiment is different from the first embodiment in that:

(1) in addition to the mapping table MTB for displaying a variable-scale wide-area surrounding image (a first surrounding image), a mapping table MTB' for displaying a surrounding image (a second surrounding image) at the same scale as that of the vehicle image is stored in the mapping memory 23;

(2) a vehicle surrounding-image determining unit 41 is provided to determine, based on the state of the vehicle, which of the surrounding images is to be displayed;

(3) a mapping-table selector 42 is provided to provide mapping-table information according to the determined surrounding image to the mapping unit 24; and (4) a vehicle-state detector 43 is provided to detect the state of the vehicle.

The vehicle-state detector 43 provides gear-shift position information and surrounding-obstacle approach information to the vehicle surrounding-image determining unit 41. When the rear end of the vehicle is spaced away from a surrounding obstacle by a predetermined distance or more when the vehicle is being backed up, the vehicle surrounding-image determining unit 41 makes a determination so as to display the first surrounding image. When the rear end of the vehicle moves within the predetermined distance from the rear of the vehicle, the vehicle surrounding-image determining unit 41 makes a determination so as to display the second surrounding image. The mapping-table selector 42 provides mapping-table information according to the determined surrounding image to the mapping unit 24. As a result, since the first surrounding image is displayed on the monitor 27 when the rear end of the vehicle is spaced away from a surrounding obstacle by the predetermined distance or more when the driver is backing up the vehicle, he or she can drive the vehicle while recognizing the state of a wide area. When the rear end of the vehicle approaches a surrounding obstacle, the second surrounding image is displayed on the monitor 27 to allow the driver to back up the vehicle while correctly recognizing the distance to the obstacle.

Although the above description has been given of a case in which surrounding images can be switched when the vehicle is backed up, the second embodiment is not limited thereto. For example, the embodiment can also be advantageously applied to a case in which surrounding images are switched and displayed based on the state of the vehicle.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A method for capturing images of the surroundings of a vehicle and displaying the captured images together with an image of the vehicle, the method comprising:
  capturing, using fisheye cameras, images of at least a landscape ahead of the vehicle, a landscape behind the vehicle, a landscape to the left side of the vehicle, and a landscape to the right side of the vehicle, and storing the captured images in at least one camera frame memory;
  storing in a table, information indicative of relationships between pixels constituting a screen image and addresses in the camera frame memories so that a portion of the surrounding images within a predetermined distance from the vehicle are displayed at the same scale as the scale of the vehicle image, and portions of the surrounding images outside the predetermined distance are displayed at a larger scale than the scale of the vehicle image;
  mapping pixel data in the at least one camera frame memory to a screen frame memory based on the relationships stored in the table to combine the surrounding images;
  reading the combined surrounding images from the screen frame memory;
  displaying the read surrounding images on a display screen; and
  wherein the relationships are stored in the table so that the surrounding images are displayed at a larger scale as a distance from the vehicle to the portion of the captured image increases, and wherein the surrounding images are displayed at the variable scale in association with a state of the vehicle and in accordance with an instruction from a navigation apparatus.

2. The method according to claim 1, wherein the vehicle image is pre-stored and the pre-stored vehicle image is displayed superimposed on the surrounding images.

3. The method according to claim 2, wherein, when a speed of the vehicle is a predetermined speed or less, the surrounding images are displayed at the variable scale.

4. The method according to claim 2, wherein, when the vehicle is shifted into reverse gear, the surrounding images are displayed at the variable scale.

5. The method according to claim 2, wherein the surrounding images are displayed at the same scale as the scale of the vehicle image or at the variable scale in association with the state of the vehicle.

6. An apparatus for displaying, on a monitor, images of the surroundings of a vehicle together with an image of the vehicle, the apparatus comprising:
  a plurality of cameras configured to capture images of at least a landscape ahead of the vehicle, a landscape behind the vehicle, a landscape to the left side of the vehicle, and a landscape to the right side of the vehicle;
  at least one camera frame memory configured to store the surrounding images captured by the cameras; and
  a controller configured to display images on a display screen and perform image control so that a portion of data in the frame memory corresponding to the surrounding images within a predetermined distance from the vehicle are displayed at the same scale as a scale of the vehicle image, and a portion of data in the frame memory corresponding to the surrounding images outside the predetermined distance are displayed at a larger scale than the scale of the vehicle image; and
  wherein the data in the frame memory is stored so that the surrounding images are displayed at a larger scale as a distance from the vehicle to the portion of the captured image increases, and wherein the surrounding images are displayed at the variable scale in association with a state of the vehicle and in accordance with an instruction from a navigation apparatus.

7. An apparatus for displaying, on a display screen, images of the surroundings of a vehicle together with an image of the vehicle, the apparatus comprising:
  a plurality of fisheye cameras configured to capture images of at least a landscape ahead of the vehicle, a landscape behind the vehicle, a landscape to the left side of the vehicle, and a landscape to the right side of the vehicle;
  at least one camera frame memory configured to store the surrounding images captured by the fisheye cameras;
  a table configured to store relationship information indicative of relationships between pixels constituting a screen and addresses in the at least one camera frame memory; and
  a mapping unit configure to map pixel data in the at least one camera frame memory to a screen frame memory based on the stored relationship information,
  wherein the relationship information is stored in the table so that a portion of data corresponding to surrounding images within a predetermined distance from the vehicle are displayed at the same scale as a scale of the vehicle image, and a portion of data corresponding to surrounding images outside the predetermined distance are displayed at a larger scale than the scale of the vehicle image, and the surrounding images are read from the screen frame memory and are displayed on the display screen; and
  wherein the relationships are stored in the table so that the surrounding images are displayed at a larger scale as a distance from the vehicle to the portion of the captured image increases, and wherein the surrounding images are displayed at the variable scale in association with a state of the vehicle and in accordance with an instruction from a navigation apparatus.

8. The apparatus according to claim 7, wherein the surrounding images that are displayed at a larger scale are displayed in a progressive manner.

9. The apparatus according to claim 7, further comprising:
  a vehicle-image storage unit for pre-storing the vehicle image; and
  a synthesizer for combining the vehicle image with the surrounding images.

10. The apparatus according to claim 7, wherein, when a speed of the vehicle is a predetermined speed or less, the surrounding images are displayed on the monitor at the variable scale.

11. The apparatus according to claim 7, wherein, when the vehicle is shifted into reverse gear, the surrounding images are displayed at the variable scale.

12. The apparatus according to claim 7, further comprising:
  a second table for storing relationships that are used to display the surrounding images at the same scale as the scale of the vehicle image; and a vehicle surrounding image determining unit for determining whether the surrounding images are to be displayed at the same scale as the scale of the vehicle image or are to be displayed at the variable scale, in accordance with a state of the vehicle, wherein the mapping unit performs the mapping using the table according to the determination performed by the vehicle surrounding-image determining unit.

* * * * *